Patented Dec. 9, 1924.

1,518,597

UNITED STATES PATENT OFFICE.

ALWIN MITTASCH AND OTTO BALZ, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MANUFACTURE AND PRODUCTION OF OXALIC ACID.

No Drawing.   Application filed August 19, 1921. Serial No. 493,651.

*To all whom it may concern:*

Be it known that we, ALWIN MITTASCH and OTTO BALZ, citizens of Germany, residing at Ludwigshafen-on-the-Rhine, Germany, have invented new and useful Improvements in the Manufacture and Production of Oxalic Acid, of which the following is a specification.

As is known oxalic acid is formed by the action of nitric acid on wood, but the reaction could not be used for the manufacture of oxalic acid in a commercial scale.

We have now found, that oxalic acid can be advantageously obtained by treating wood with nitric acid, or with oxids of nitrogen and water as equivalents of nitric acid, in the presence of certain metal compounds acting as catalysts. Compounds of iron have proved very suitable agents for this purpose. The speed of the reaction is considerably increased and the yield of oxalic acid formed highly improved by the use of this invention.

The invention is more fully explained with reference to the following examples to which however the invention is not limited.

Wood, in small pieces, is soaked in a solution of iron nitrate and treated with a current of nitrous gases at a temperature of about 60 degrees centigrade. The wood is quickly dissolved, and after a period of time, which may be ascertained by preliminary experiments for the conditions chosen, the mixture is filtered, while hot, to separate the cellulose, which remains unattacked, or high molecular decomposition products thereof, whereupon the oxalic acid—which is chiefly produced from the so-called incrusting substances of the wood—is caused to crystallize from the filtrate by cooling and is then obtained by centrifuging. The mother liquor is used for soaking a fresh quantity of wood and the treatment with nitrous gases is repeated. The reaction liquor may also be evaporated in vacuo before crystallizing the oxalic acid or it may be used for repeated treatment of wood before separating the oxalic acid. Nitric acid of sufficient strength may be used instead of nitrous gases, in which case the wood may be treated with nitric acid containing iron nitrate, while stirring, and then worked up in the manner already described. The ferric liquor separated from the oxalic acid may be used again after fresh nitric acid has been added. The temperature should not, generally speaking, be allowed to rise above about 70 degrees centigrade. The escaping gases, containing lower oxids of nitrogen, can be absorbed with water to form nitric acid in the usual way after being suitably oxidized and the nitric acid can then be used again. The process can also be made a continuous one.

We claim:—

1. The process of producing oxalic acid which consists in acting on wood with nitric acid in the presence of an iron compound.

2. The process of producing oxalic acid which consists in heating wood with nitric acid in the presence of ferric nitrate.

In testimony whereof we have hereunto set our hands.

ALWIN MITTASCH.
OTTO BALZ.